C. A. HAAS.
WATER HEATER.
APPLICATION FILED FEB. 27, 1913.
1,079,005.
Patented Nov. 18, 1913.
2 SHEETS—SHEET 1.
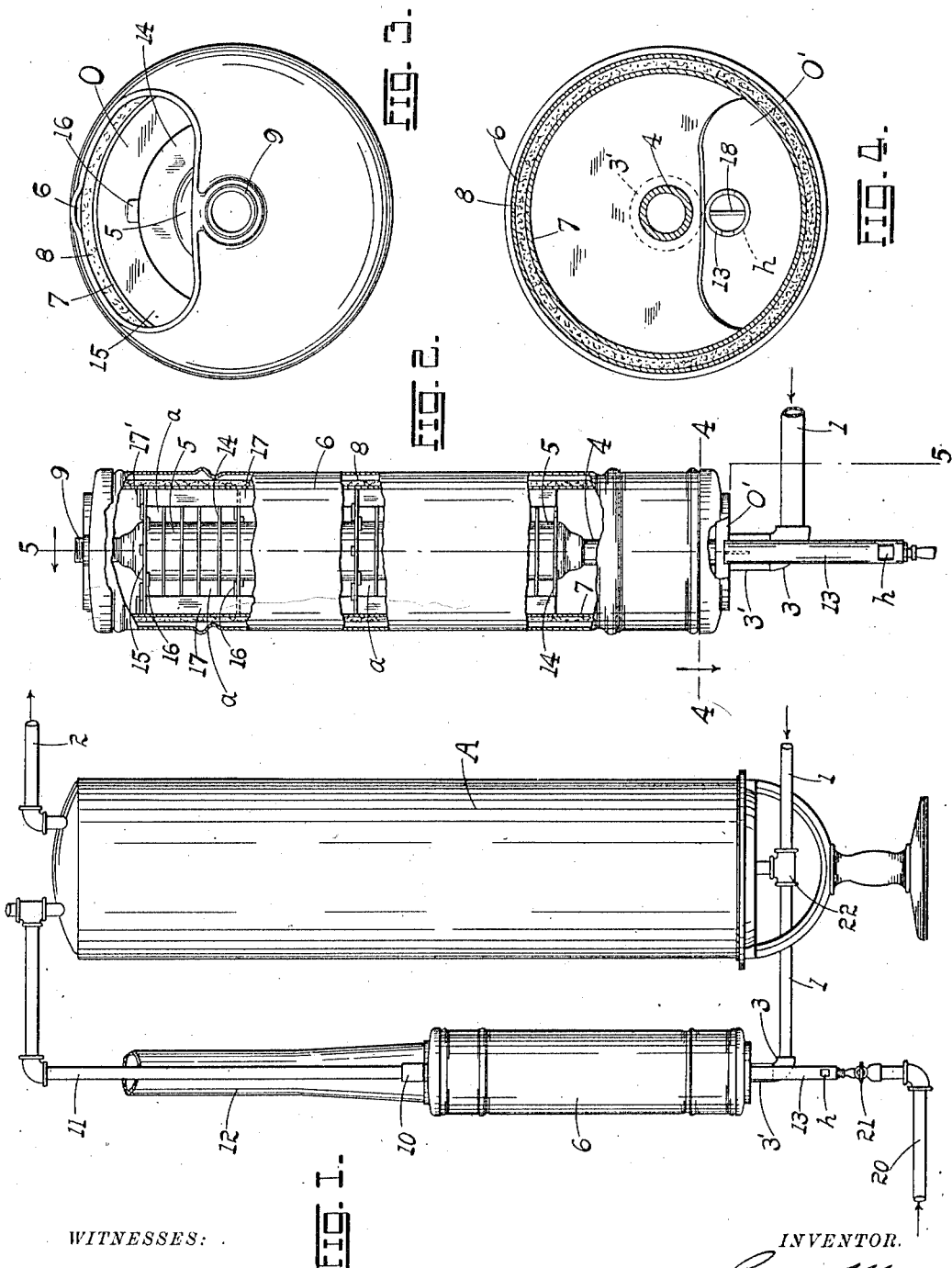
WITNESSES:
Harry A. Beiner
Josa Michel
INVENTOR.
Cyrus Haas
BY Ernst Starck
ATTORNEY.

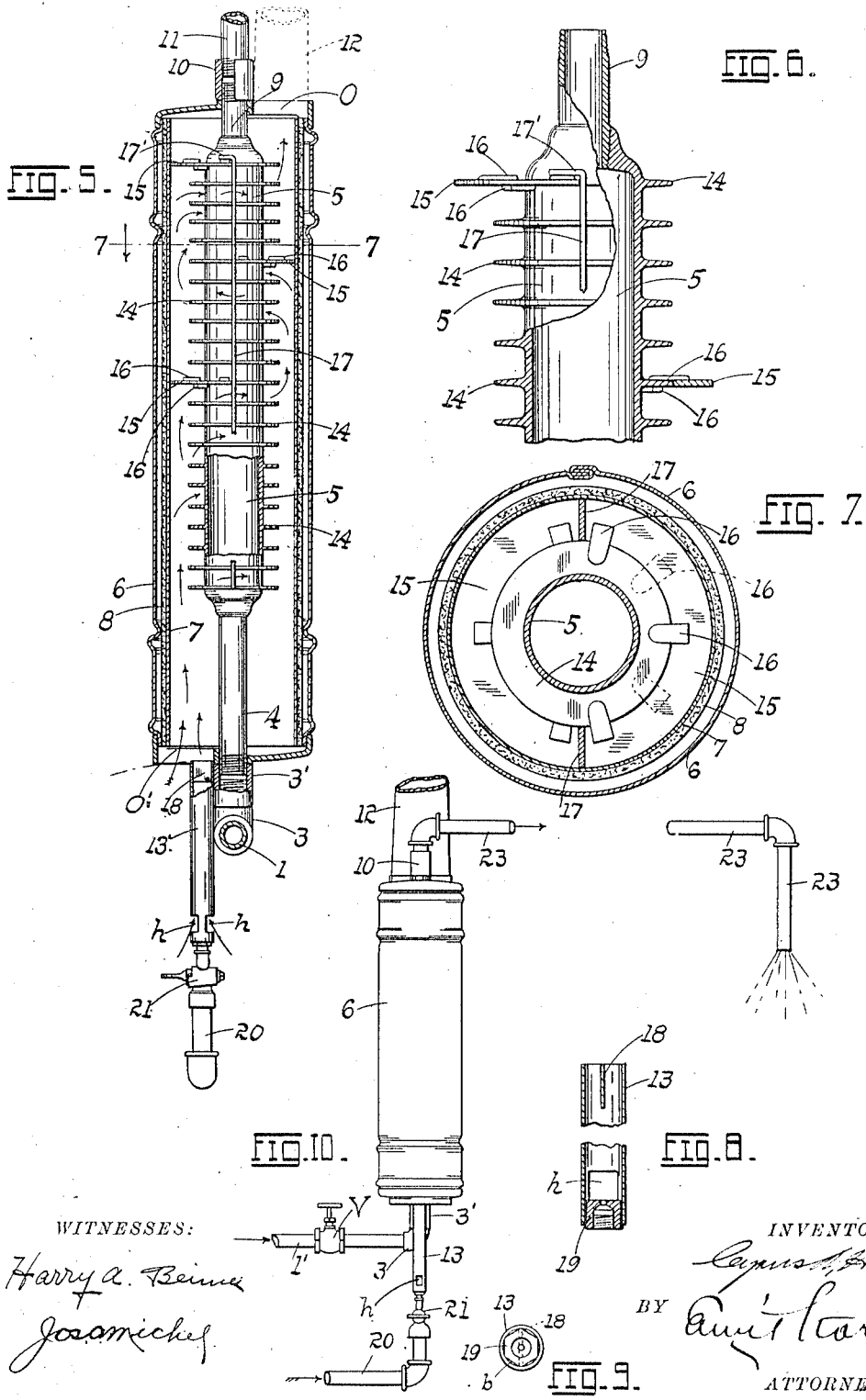

UNITED STATES PATENT OFFICE.

CYRUS A. HAAS, OF ST. LOUIS, MISSOURI.

WATER-HEATER.

1,079,005.

Specification of Letters Patent.  Patented Nov. 18, 1913.

Application filed February 27, 1913. Serial No. 751,063.

*To all whom it may concern:*

Be it known that I, CYRUS A. HAAS, citizen of the United States, residing at St. Louis, State of Missouri, have invented certain new and useful Improvements in Water-Heaters, of which the following is a full, clear, and exact description, reference being had to the accompanying drawings, forming a part hereof.

My invention has relation to improvements in water-heaters; and it consists in the novel details of construction more fully set forth in the specification and pointed out in the claims.

In the drawings, Figure 1 is a front elevation of a conventional water-tank showing my invention coupled thereto; Fig. 2 is an enlarged elevational view of the heater with parts broken away to expose the interior thereof; Fig. 3 is a top plan of the heater on a still larger scale; Fig. 4 is a horizontal section on the line 4—4 of Fig. 2; Fig. 5 is a vertical middle section of the outer shell or casing on the line 5—5 of Fig. 2, the inner boiler being left in elevation; Fig. 6 is a combined elevational and sectional detail of the upper portion of the boiler or water circulating member of the heater; Fig. 7 is an enlarged horizontal section on the line 7—7 of Fig. 5; Fig. 8 is a vertical sectional detail of the free end of the burner; Fig. 9 is a bottom plan view of Fig. 8; and Fig. 10 is a side elevation of the heater showing its application as a steam generator and detached from the water-tank.

The object of my invention is to construct a water heater which will have a maximum heating capacity relatively to its fuel consumption; one which will heat to any desired temperature a maximum quantity of water in a minimum amount of time; one which is economical in its fuel consumption; one particularly adapted for use in connection with gas or vapor burners; one which may operate in connection with a low flame without danger of back-flash; one readily assembled and attached; one conserving and utilizing to the best advantage the heat units developed by the fuel employed; one setting up rapid circulation in the water which is heated; one which is condensed and light; and one possessing further and other advantages better apparent from a detailed description of the invention which is as follows.

Referring to the drawings, and for the present to Figs. 1 to 9 inclusive, A represents a conventional reservoir or water-tank, 1, the cold-water supply pipe tapping the bottom thereof, and 2 the hot-water pipe which dips to the bottom of the tank as well understood in the art. By means of an elbow 3 or equivalent connection the pipe 1 is coupled (through the union 3') to the pipe 4 forming the depending intake of the water-circulating member or boiler 5 of my improved heater. In the present embodiment of my invention the boiler 5 is confined in a casing comprising an outer shell 6, an inner shell 7, and an intermediate heat insulating or heat non-conducting layer 8 of asbestos or its equivalent, the component parts of said casing being united frictionally or otherwise by any mechanical method known to the art. The discharge pipe 9 from the boiler 5 passes through the top of the outer casing where it is connected through a union or coupling 10 to the circulating pipe 11 which taps the top of the tank A. The outer casing (6, 7, 8) is closed at the top with the exception of the flue opening O from which leads the exit or gas flue 12, the bottom of the casing being likewise closed save for the gas intake opening O' for the insertion of the burner pipe 13 and for the admission of air for assisting in the combustion of the gases discharging from the burner. The openings O, O', are diagonally opposite one another as shown.

To insure the longest possible traverse for the combustion products and hot gases through the heater, and to cause the same to intimately hug the walls of the boiler 5, the following provision is made:—Disposed about the peripheral walls of the boiler in planes preferably (though not necessarily) at right angles to its axis, are a series of fins or annular (or equivalent) ribs 14 whose peripheries are disposed along the surface of a cylinder (the boiler 5 itself being cylindrical), said flues being suitably spaced apart and being distributed the full length of the boiler between the pipes 4 and 9. Clamped at intervals to the fins, and on opposite sides of the axis of the boiler are substantially semi-annular deflecting plates or baffles 15, the opposite faces whereof carry fingers or lobes 16 disposed preferably in staggered relation, whereby a baffle may be readily and frictionally secured to any fin. It will be seen that the fingers or lobes project beyond the inner edge of the baffle, the projecting portions leading from one face of the baffle engaging the top face of a fin, those projecting from the opposite face engaging the bottom face of the fin, the baffles being thus readily detachable and applied or adjusted to, any fin that may be desired. The baffles are in practice disposed successively on opposite sides of the axis of the boiler, three such baffles being shown in the illustration (Fig. 5). The baffle fills one-half the space between the boiler and outer shell or casing so that the products of combustion in striking the baffle are deflected and caused to cross over to the opposite side of the space traversed thereby. The baffles 15 are just sufficiently short of a complete semi-circle to permit of the insertion between their adjacent ends of a vertical snugly-fitting strip or deflector member 17, spanning the space between the fins and outer shell, there being two such strips at points diametrically opposite one another as shown (Fig. 2). These strips are preferably supported by terminal bends or lugs 17' resting on top of the top baffle (Figs. 2, 5), though they may be detachably supported in any other convenient or suitable mechanical manner. The pipes 1 and 11 may suffice to secure the heater to the tank A, but if insufficient, the heater may be additionally supported in any manner appealing to the skilled mechanic.

To prevent back flashing of the flame when the burner is low I provide the discharge end of the burner pipe 13 with a diaphragm or rib 18 spanning diametrically the opening of the pipe as shown (Figs. 4, 5, 8). In other respects the burner is of the Bunsen variety, except that the air intake openings $h$ are of considerable size to afford a maximum influx of air to the gas component, which is supplied through the hexagonal or polygonal tip 19 at the discharge end of the gas supply pipe 20 beyond the usual cock or valve 21. The tip 19 has a drive fit in the pipe 13, passages $b$ being left between its faces and the inner wall of the pipe for the influx of air (Fig. 9).

The operation of the heater will be readily understood from the foregoing description and is substantially as follows:—The cock 21 being opened the gas (or equivalent vapor) is allowed to flow into the burner 13 where it is ignited by the insertion of a lighted match or taper into the opening O'. The hot gases and combustion products before they can escape through the flue 12 must necessarily traverse the space between the boiler 5 and outer shell in which traverse they not only impinge against the several fins (which afford extended surfaces of contact), but being deflected by the horizontal baffles 15 they are caused to pass transversely first in one direction and then the other, it being remembered that the successive baffles are on opposite sides of the axis of the boiler. Again, and as illustrated to best advantage in Fig. 7, the vertical strips or baffles 17 spanning as they do the space between the outer edges of the fins 14 and the inner wall of the outer shell, constrain the products deflected by the baffles 15 to pass through the passages $a$ (Fig. 2) between the inner edges of the strips and the outer wall of the boiler and thus hug the boiler walls. In this way the contents of the boiler (which is in free communication with the tank A) becomes rapidly heated and a rapid circulation sets up so that in a very short space of time the tank A is full of hot water. The general path or traverse of the hot gases as described is substantially indicated by the arrows in Fig. 5. The hot water of course rises through the pipe 11 and discharges into the tank, the cold water leaving the tank from the bottom through the tee 22 and entering the boiler through the pipe 1 as quite obvious from the drawings. By the time the gases have traversed the circuitous path defined for them by the fins, and horizontal and vertical deflecting members as aforesaid, they have parted with the majority of their heat units, and when they finally escape from the flue 12 they are comparatively cool.

In Fig. 10 the heater is shown detached and not connected to a water tank. In that case I employ the same as a steamer, the cold water being admitted to the boiler through the pipe 1' provided with a valve V, the steam generated being allowed to discharge through the pipe 23 for steam baths or other domestic purpose. In other respects the boiler is the same as that already described, and the same reference numerals are used to designate parts corresponding to those shown in the other views.

Having described my invention, what I claim is:—

1. In combination with a boiler having intake and discharge means for a circulating medium, an outer casing surrounding the same and spaced therefrom, suitable surface-exposing formations on the outer walls of the boiler, intake and discharge openings for hot gases formed in the casing respectively at opposite ends thereof, means detachably coupled to said formations for deflecting the gases at various points of their traverse through the space around the boiler, and means for causing said gases to hug the boiler walls.

2. In combination with a boiler traversed by a circulating medium, a series of peripheral fins formed on the outer surface of the boiler walls, an outer shell or casing surrounding said boiler and spaced from the outer edges of the fins, the ends of the casing being provided respectively with intake and discharge means for hot gases, detachable deflecting plates disposed at intervals on opposite sides of the axis of the boiler and each spanning a portion of the transverse sectional area of the space between the fins and inner wall of the shell, for the purpose set forth.

3. In combination with a boiler traversed by a circulating medium, a series of peripheral fins formed on the outer surface of the boiler walls, an outer shell or casing surrounding the boiler and spaced from the outer edges of the fins, the ends of the casing being respectively provided with intake and discharge openings for hot gases, deflecting plates disposed at intervals and detachably secured to the fins on opposite sides of the axis of the boiler, each plate spanning a portion of the transverse sectional area of the space between the fins and inner wall of the shell, for the purpose set forth.

4. In combination with a boiler traversed by a circulating medium, a series of peripheral fins disposed along the peripheral walls of the boiler, an outer casing spaced from the fins, and deflecting plates interposed between the fins and casing walls and provided with fingers adapted to span the fins whereby they are detachably secured thereto.

5. In combination with a substantially cylindrical boiler having intake and discharge means for water, a series of fins disposed along the peripheral walls thereof and spaced apart, and in planes transverse to the axis of the boiler, an outer casing or shell spaced from the fins and boiler, the opposite ends of the shell being respectively provided with diagonally opposite intake and discharge openings for hot gases, a series of substantially semi-annular transverse deflecting plates interposed at intervals on opposite sides of the axis of the boiler between the fins and inner surface of the shell wall, the contiguous ends of the plates being disposed along vertical planes slightly separated or spaced apart, and suitable vertical strips or deflectors inserted through said space and filling the gap between the fins and the inner surface of the shell wall, for the purpose set forth.

6. In combination with a water-circulating boiler, an outer shell surrounding the same and spaced therefrom, a series of parallel fins disposed at intervals along the outer walls of the boiler and out of contact with the shell, a series of horizontal deflectors distributed at intervals on opposite sides of the axis of the boiler between the fins and inner shell walls, and a series of vertical deflectors between the fins and inner walls of the shell, as set forth.

7. In a water heater, a segmental deflector provided with fingers on opposite sides thereof and projecting beyond the edge of the deflector for the purpose set forth.

In testimony whereof I affix my signature, in presence of two witnesses.

CYRUS A. HAAS.

Witnesses:
 EMIL STAREK,
 FANNIE E. WEBER.